United States Patent
Rao

(10) Patent No.: US 9,674,279 B2
(45) Date of Patent: Jun. 6, 2017

(54) METHODS, DEVICES, AND SYSTEMS FOR ALLOCATING SERVICE NODES IN A NETWORK

(71) Applicant: Tencent Technology (Shenzhen) Company Limited, Shenzhen, Guangdong (CN)

(72) Inventor: Ming Rao, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/100,691

(22) PCT Filed: Dec. 27, 2014

(86) PCT No.: PCT/CN2014/095219
§ 371 (c)(1),
(2) Date: Jun. 1, 2016

(87) PCT Pub. No.: WO2015/101237
PCT Pub. Date: Jul. 9, 2015

(65) Prior Publication Data
US 2016/0308961 A1  Oct. 20, 2016

(30) Foreign Application Priority Data
Jan. 6, 2014 (CN) .......................... 2014 1 0005674

(51) Int. Cl.
*H04L 29/08* (2006.01)
(52) U.S. Cl.
CPC ...... *H04L 67/1036* (2013.01); *H04L 67/1012* (2013.01); *H04L 67/1029* (2013.01)
(58) Field of Classification Search
None
See application file for complete search history.

(56) References Cited

U.S. PATENT DOCUMENTS 6,038,599 A * 3/2000 Black .................. H04L 12/2602
709/223
7,539,193 B2 * 5/2009 Pfeffer ................ H04L 12/2801
370/235

(Continued)

FOREIGN PATENT DOCUMENTS

| CN | 1926806 A | 3/2007 |
| CN | 101989951 A | 3/2011 |
| WO | 2013113181 A1 | 8/2013 |

OTHER PUBLICATIONS

Liu, Ran et al. "CQS3: a Server Selection Scheme for Mobile Multimedia Delivery", Journal of Chinese Computer Systems, vol. No. 1, No. vol. 34, Jan. 31, 2013 (Jan. 31, 2013), ISSN: ISSN 1000-1220, pp. 131 to 135.

(Continued)

Primary Examiner — Anh-Vu Ly
Assistant Examiner — Robert A Shand

(57) ABSTRACT

A network system for allocating service nodes to a user terminal to login a network may comprises a gateway node, a plurality of service nodes, a sampling terminal, a gateway node, and a login node. The system may receive service nodes information of the plurality of service nodes from the sampling terminal; obtain from the sampling terminal network quality sampling data associating with each of the plurality of service nodes; identify the gateway node corresponding to the sampling terminal; select a plurality of candidate service nodes from the plurality of service nodes based on the network quality sampling data; obtain network quality parameters between each of the plurality of candidate service node and the gateway node; select a target service node from the plurality of candidate service nodes based on the network quality sampling data and the candidate node network quality parameters; and allocate the target service node to the gateway node.

20 Claims, 7 Drawing Sheets

(56) References Cited

U.S. PATENT DOCUMENTS

| | | | |
|---|---|---|---|
| 8,671,179 B2* | 3/2014 | Altaf | H04L 67/322 709/224 |
| 2003/0123424 A1* | 7/2003 | Jung | H04L 67/1023 370/338 |
| 2005/0130681 A1* | 6/2005 | Charles | H04L 63/12 455/461 |
| 2006/0248372 A1* | 11/2006 | Aggarwal | G06F 9/5044 714/4.5 |
| 2011/0078298 A1* | 3/2011 | Sakai | G06F 11/0709 709/223 |
| 2012/0246638 A1* | 9/2012 | He | G06F 9/45558 718/1 |

OTHER PUBLICATIONS

International Search Report issued Mar. 16, 2015 in International Application No. PCT/CN2014/095219.
Written Opinion issued Mar. 16, 2015 in International Application No. PCT/CN2014/095219.

* cited by examiner

METHODS, DEVICES, AND SYSTEMS FOR ALLOCATING SERVICE NODES IN A NETWORK

PRIORITY STATEMENT

This application is a national stage application of International Application No. PCT/CN2014/095219, filed on Dec. 27, 2014, in the State Intellectual Property Office of the People's Republic of China, which claims the priority benefit of Chinese Patent Application No. 201410005674.0 filed on Jan. 6, 2014, the disclosures of which are incorporated herein in their entirety by reference.

TECHNICAL FIELD

The present disclosure relates to the field of network technologies. Specifically, the present disclosure relates to methods, devices, and systems for allocating service nodes.

BACKGROUND

Large-scale Internet application systems, especially those using wireless connections, have large numbers of users. For example, WeChat, a social communication platform operated by Tencent Co. Ltd., provides instant communication and other social functions to mobile terminal (e.g., smart phone) users all over the world. Because the users of an Internet application are generally distributed in multiple regions all over the country, when they connect to a server of the network of the Internet application through a wireless connection, system delays often occur. To solve this problem, one or more service nodes are generally deployed in each region and dedicated to meeting the service needs of the users in that region. However, allocating service nodes to a terminal user merely based on his/her geographical location does not guarantee a reliable connection without delay. This is because the quality of Internet connection varies over time. A node that is geographically close to a terminal user may have a good Internet connection when it is allocated to the terminal user, but the connection may become worse after the terminal user is connected. Consequently, the network quality achieved between the terminal user and the allocated service nodes cannot be guaranteed.

SUMMARY

The present disclosure discloses methods, devices, and systems for allocating service nodes of Internet application systems to improve Internet connections between the service nodes and terminal users.

According to an aspect of the present disclosure, a computer device may comprise a processor-readable storage medium storing a set of instructions configured to allocate a plurality of service nodes in a network to mobile user terminal and a processor in communication with the storage medium. The network may comprise a gateway node in communication with the plurality of service nodes, a sampling terminal in communication with the gateway node, and a login node in communication with the sampling terminal, the gateway node, and the plurality of service node. When executing the set of instructions the processor may be programmed to perform functions to, when receiving a login request from a mobile user terminal: receive service nodes information of the plurality of service nodes from the sampling terminal; obtain from the sampling terminal network quality sampling data associating with each of the plurality of service nodes; identify the gateway node corresponding to the sampling terminal; select a plurality of candidate service nodes from the plurality of service nodes based on the network quality sampling data; obtain network quality parameters between each of the plurality of candidate service node and the gateway node; select a target service node from the plurality of candidate service nodes based on the network quality sampling data and the candidate node network quality parameters; and allocate the target service node to the gateway node.

According to another aspect of the present disclosure, a network system for allocating service nodes to a mobile user terminal to login a network may comprise a plurality of service nodes; a gateway node in communication with the plurality of service nodes; a sampling terminal in communication with the gateway node; and a login node in communication with the sampling terminal, the gateway node, and the plurality of service node. When the system receives a login request from a mobile user terminal, the sampling terminal is configured to obtain the network quality sampling data of service nodes, and send the data to the login node by using the gateway node; the login node is configured to obtain the network quality sampling data, identify the gateway node corresponding to the sampling terminal, and select a plurality of candidate service nodes corresponding to the gateway node from the plurality of service nodes based on the network quality sampling data; the candidate service node may be configured to obtain the candidate node network quality parameters corresponding to the gateway node, and send the parameters to the login node. The login node is then configured to select a target service node from the plurality of candidate service nodes based on the network quality sampling data and the candidate node network quality parameters, and allocate the target service node to the gateway node.

According to yet another aspect of the present disclosure, a method for allocating a service node to a mobile user terminal to login a network may comprises: providing a network system programed to allocate a plurality of service nodes in a network, wherein the network comprises a gateway node in communication with the plurality of service nodes, a sampling terminal in communication with the gateway node, and a login node in communication with the sampling terminal, the gateway node, and the plurality of service node. When the network receives a login request from a mobile user terminal, the method may comprises receiving, by the network system, service nodes information of the plurality of service nodes from the sampling terminal; obtaining, by the network system from the sampling terminal, network quality sampling data associating with each of the plurality of service nodes; identifying, by the network system, the gateway node corresponding to the sampling terminal; selecting, by the network system, a plurality of candidate service nodes from the plurality of service nodes based on the network quality sampling data; obtaining, by the network system, network quality parameters between each of the plurality of candidate service node and the gateway node; selecting, by the network system, a target service node from the plurality of candidate service nodes based on the network quality sampling data and the candidate node network quality parameters; and allocating, by the network system, the target service node to the gateway node.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 2:
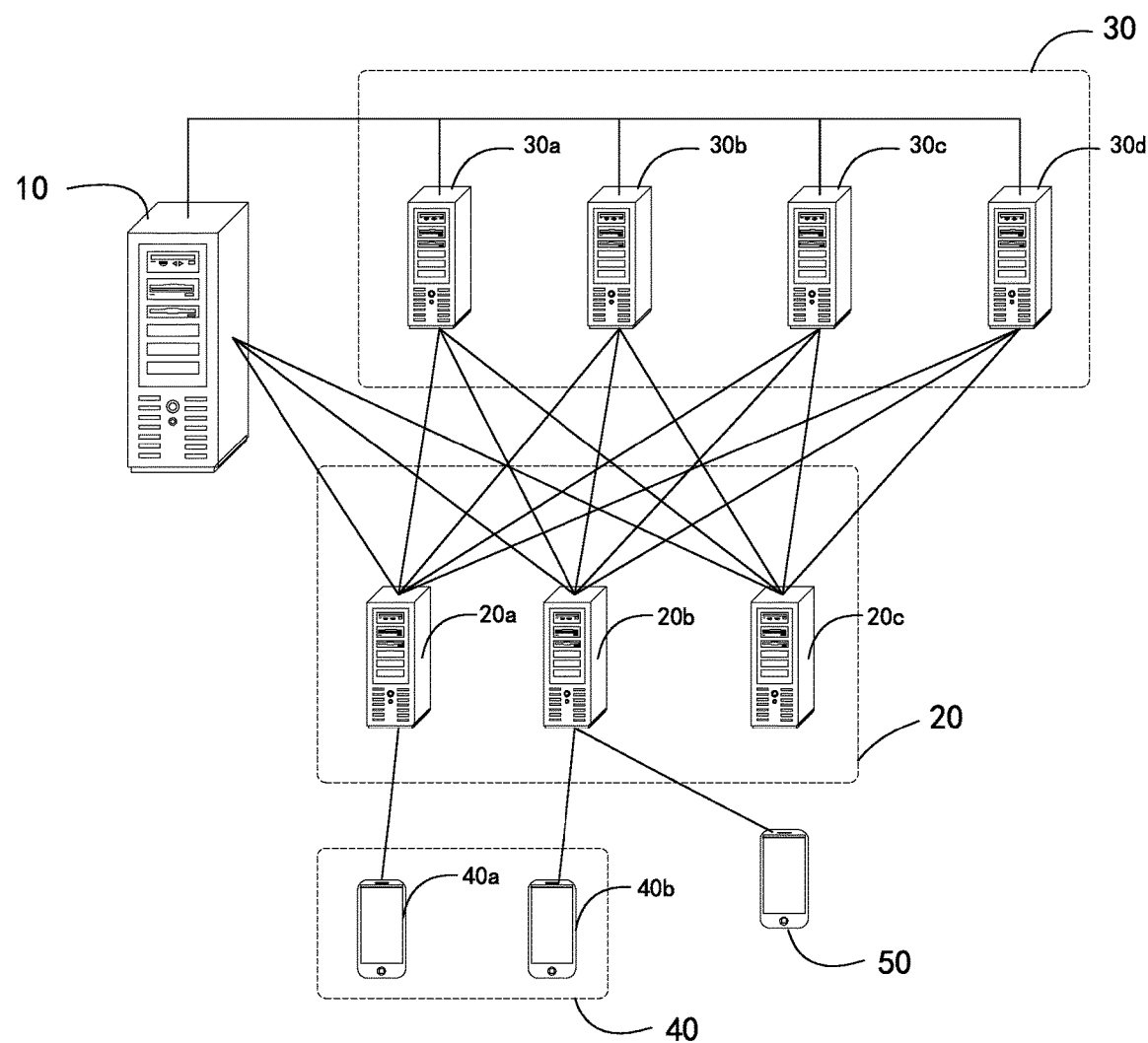
FIG. 2 is a structural diagram illustrating a topology of a service node allocating system according to example embodiments of the present disclosure.

FIG. 2 is a structural diagram illustrating a service node allocating system according to example embodiments of the present disclosure. The system comprises a login node 10, a gateway node 20, service nodes 30, a sampling terminal 40, and a user terminal 50 (e.g., a mobile terminal, or mobile user terminal). The method may be implemented in the login node 10. The gateway node 20 is in communication with the service nodes 30, the sampling terminal 40 is in communication with the gateway node 20, and the login node 10 is in communication with the sampling terminal 40, the gateway node 20, and the service nodes 30. Each server may be a computer and/or a computer system based on von Neumann computer architecture. Details of the computer and/or computer system are introduced in FIG. 7 below.

The login node 10 is an ingress server used by a user for accessing the Internet with a terminal. After the user is connected to the login node 10, a service node allocation request may be sent to the login node 10 for allocating service nodes to meet the corresponding service needs. For example, in an online game application scenario, a user first completes identity verification on the login node 10; then, the login node allocates an online game server suitable for the user to execute relevant game services. In an instant communication application scenario, such as when a user is using WeChat to communicate with a friend, the user first completes identity verification on the login node 10; then, the login node allocates a cache server suitable for the user to forward and cache instant communication messages.

The gateway node 20 may be a gateway or a computer with gateway functions deployed between a subnet and the wide area network (WAN). For example, if a user is connected to the Internet with a mobile terminal using a 2G or 3G mobile network, the gateway node is the corresponding Gateway GPRS Support Node (GGSN) or a Packet Data Network Gateway (PGW) on a 4G network. A mobile terminal may need to first establish a data connection with a base station in the region where the mobile terminal resides. Then, the base station may be connected to the corresponding GGSN. Finally, the mobile terminal may be connected to the Internet using the GGSN. The GGSN may then forward communication data between the user's mobile terminal and a service node on the WAN.

The services node 30 may be an application server or application server cluster deployed, generally as an equipment room, on the WAN. In the scenario where the application is an online game, an online game provider normally leases the equipment rooms in multiple regions in a province, with each equipment room representing the corresponding service node 30. For example, if the online game has servers in Guangdong region 1 (region 1 of Guangdong province, China), Guangdong region 2, and Guangdong region 3, that means the online game provider is providing three server equipment rooms in Guangdong province for users of the online game, wherein each equipment room includes one or more game servers. Each service node of the online game may be the one or more servers in a single equipment room.

The service nodes 30 may be a group of servers, for example, the online game servers mentioned in the preceding scenario, in a distributed server cluster or a Content Delivery Network (CDN) node connected to a business server. For example, in a download application (an application for downloading data) scenario, the service nodes 30 may include a CDN server that provides data download acceleration services for user terminals and a business server that provides the original download data. If no user download request is cached on the CDN server, the CDN server first requests data from the business server and sends the data to the user terminal.

Note that, in other embodiments, the login node 10 may be the business server or a server only used to allocate service nodes. That is, the login node 10 may function as a service node to provide the corresponding business services for user terminals or only execute the method provided by the present disclosure to allocate service nodes to user terminals.

The sampling terminal 40 and the user terminal 50 are both terminals on a subnet administered by the gateway node. In the present embodiment, the sampling terminal 40 may be a preset terminal that an operator dedicates to sampling; an operator may set a sampling terminal for each gateway node. In another embodiment, the sampling terminal 40 may also be a terminal used by a user and may perform sampling based on the operations recorded when the user uses the terminal.

Figure 1:
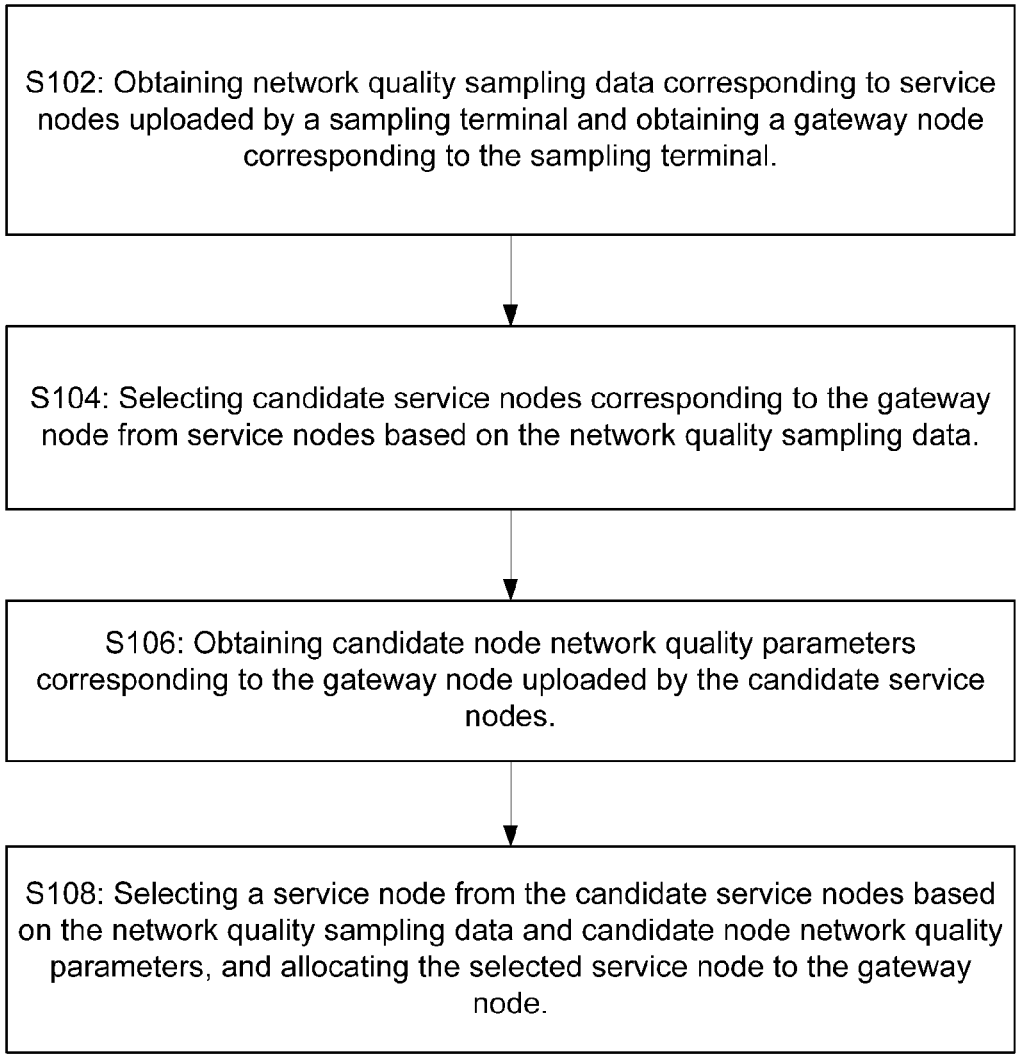
FIG. 1 is a flowchart illustrating a service node allocating method according to example embodiments of the present disclosure.

FIG. 1 is a flowchart illustrating a service node allocating method according to example embodiments of the present disclosure. The method may be implemented by computers and/or computer systems, such as the servers in FIG. 2. For example, the method may be embedded in specific computer programs (i.e., sets of computer instructions). The computer programs may be stored in a storage medium of the service node allocating system and may be executed by the system as a function of the system. The method may include the following steps:

Step S102. Obtaining network quality sampling data corresponding to the service nodes uploaded by a sampling terminal and obtaining a gateway node corresponding to the sampling terminal.

The system may regularly obtain the network quality sampling data. Alternatively, the system may obtain the network quality sampling data in response to a login request from a user terminal. For example, in FIG. 2 when a user terminal (e.g., a mobile terminal) 50 sends a request to a gateway node 20b to login the subnet and the wide area network (WAN), the request may trigger the gateway node 20b, and correspondingly other nodes in the system such as the login node 10, may respond as well, such as obtaining network quality sampling data corresponding to the service nodes uploaded by a sampling terminal and obtaining a gateway node corresponding to the sampling terminal 40.

Step S104: Selecting candidate service nodes corresponding to the gateway node from service nodes based on the network quality sampling data.

As shown in FIG. 2, the sampling terminal 40 is on a subnet administered by the gateway node 20 and needs to be connected to a service node 30a, 30b, 30c, 30d using the gateway node 20. The sampling terminal 40 may send test messages to each service node 30a, 30b, 30c, 30d to obtain the network quality sampling data that reflects the quality of the links between the sampling terminal 40 and each service node 30a, 30b, 30c, 30d and upload the network quality sampling data to the login node (e.g. a login server) 10.

The network quality sampling data obtained by the sampling terminal 40 may include the first network delay between the sampling terminal 40 and service nodes 30a, 30b, 30c, 30d and the available bandwidths of service nodes 30a, 30b, 30c, 30d. The sampling terminal 40 may obtain the available bandwidths of service nodes 30a, 30b, 30c, 30d by obtaining the maximum and average download speeds of the service nodes 30a, 30b, 30c, 30d.

A preset number of service nodes with the shortest first network delay may be selected as candidate service nodes corresponding to the gateway node 20. For example, in FIG. 2, the sampling terminal 40a is connected to the WAN by using the gateway node 20a; servers deployed on the WAN include service node 30a, service node 30b, service node 30c, and service node 30d; the sampling terminal 40a may send test messages to service node 30a, service node 30b, service node 30c, and service node 30d respectively, calculate the download speed, and obtain the corresponding first network delay values La, Lb, Lc, and Ld (La<Lb<Lc<Ld) and the corresponding available bandwidths BWa, BWb, BWc, and BWd. If the preset number for selecting candidate service nodes is 3, the three service nodes with shortest first network delay are selected as the candidate service nodes, i.e., the service node 30a, the service node 30b, and the service node 30c are selected as the candidate service nodes corresponding to the gateway node 20a.

Step S106: Obtaining candidate node network quality parameters corresponding to the gateway node uploaded by the candidate service nodes.

The candidate node network quality parameters may include the second network delay and packet loss rates from service nodes to the gateway node. A service node may obtain the second network delay and packet loss rates between itself and each gateway node and upload the obtained data to the login node. As shown in FIG. 2, the gateway nodes are the gateway node 20a, gateway node 20b, and gateway node 20c. The service node 30a may obtain the network delay (i.e., the second network delay) and packet loss rates (a rate that data packets communicated between the gateway node and the service node 30a fail to correctly transmitted.) between itself and the gateway node 20a, gateway node 20b, and gateway node 20c respectively by sending Ping messages to the corresponding gateway node 20a, 20b, 20c. Here a Ping message is a signal sent from a computer to check if the computer is connected to a network. It also determines the latency or delay between two computers. As described in the preceding example, the service node 30a is selected as a candidate service node of the gateway node 20a. Thus, the candidate node network quality parameters, including the second network delay and packet loss rate corresponding to the gateway node 20a, uploaded by the service node 30a may be obtained.

Step S108: Selecting a service node from the candidate service nodes based on the network quality sampling data and the candidate node network quality parameters, and allocating the selected service node to the gateway node, wherein the gateway node subsequently connect the service node to the user terminal.

As described above, the network quality sampling data may include the first network delay from the sampling terminal to candidate service nodes and the available bandwidths to candidate service nodes; candidate node network quality parameters may include the second network delay and packet loss rates from candidate service nodes to the gateway nodes corresponding to the sampling terminal. Thus, the first network delay, available bandwidth, second network delay, and/or packet loss rate may be referenced to select service nodes from candidate service nodes and allocate the selected nodes to the gateway node. For example, the candidate service nodes with a shorter first network delay, shorter second network delay, and lower packet loss rate and a higher available bandwidth may be selected and allocated to the gateway node.

The step of selecting a service node from candidate service nodes based on network quality sampling data and candidate node network quality parameters, and allocating the selected service node to the gateway node may further comprise: generating node weight coefficients of the candidate service nodes based on the available bandwidth; selecting a service node from the candidate service nodes based on the node weight coefficients corresponding to the candidate service nodes and the candidate node network quality parameters; and allocating the selected service node to the gateway node.

Further, the step of selecting a service node from the candidate service nodes based on the node weight coefficients corresponding to the candidate service nodes and the candidate node network quality parameters, and allocating the selected service node to the gateway node may further comprise: generating the node quality reference values corresponding to the candidate service nodes based on the node weight coefficients, the second network delay, and packet loss rates corresponding to the candidate service nodes; and selecting the service nodes corresponding to the gateway node based on the node quality reference values of the candidate service nodes.

Further, the node quality reference value may be obtained based on the following formula:

$$V_i = \text{delay}_i \times (a + plp_i) \times Q_i,$$

wherein $V_i$ indicates the node quality reference value of the ith candidate serviced node; $\text{delay}_i$ indicates the second network delay of the ith candidate serviced node; $plp_i$ indicates the packet loss rate of the ith candidate serviced node; $Q_i$ indicates the node weight coefficient of the ith candidate serviced node; a is a preset parameter, such as a=1.

The node quality reference values are the values that reflect the states of the links between service nodes and gateway nodes. The smaller the node quality reference value, the better the state of the link between a service node and a gateway node is.

As described in the preceding example embodiments, the sampling terminal 40a is connected to the WAN by using the gateway node 20a, and the obtained candidate service nodes are the above-mentioned service node 30a, service node 30b, and service node 30c. Thus, the node quality reference values $V_{aa}$, $V_{ab}$, and $V_{ac}$ may be calculated respectively on the basis of the second network delay and packet loss rates between the service node 30a, service node 30b, service node 30c and the gateway node 20a that are uploaded to the login node 10 by the three service nodes 30a, 30b, 30c. If $V_{aa}$ is the smallest among the three values, the service node 30a may be allocated to the gateway node 20a.

Similarly, as shown in FIG. 2, the sampling terminal 40b is connected to the WAN by using the gateway node 20b. If the obtained candidate service nodes are still the above-mentioned service node 30a, service node 30b, and service node 30c, the node quality reference values $V_{ba}$, $V_{bb}$, and $V_{bc}$ may be calculated respectively on the basis of the second network delay and packet loss rates between the service node 30a, service node 30b, service node 30c and the gateway node 20a that are uploaded to the login node by the three service nodes. If $V_{bb}$ is the smallest among the three values, the service node 30b may be allocated to the gateway node 20b.

Likewise, a service node may be allocated to the gateway node 20c by using the same method. Table 1 lists the service nodes allocated to gateway nodes.

TABLE 1

|  | Service node 30a | Service node 30b | Service node 30c | Service node 30d |
| --- | --- | --- | --- | --- |
| Gateway node 20a | $V_{aa}$ (optimal) | $V_{ab}$ | $V_{ac}$ | N/A |
| Gateway node 20b | $V_{ba}$ | $V_{bb}$ (optimal) | $V_{bc}$ | N/A |
| Gateway node 20c | $V_{ca}$ | N/A | $V_{cc}$ | $V_{cd}$ (optimal) |

Note that, the N/A indicates the candidate service node of the gateway node corresponding to a service node. In addition, Table 1 is only used to indicate the relationships between gateway nodes and allocated service nodes. No data table or mapping as described in Table 1 needs to be established in actual application.

The step of selecting a service node from candidate service nodes based on network quality sampling data and candidate node network quality parameters, and allocating the selected service node to the gateway node may further comprise: receiving a service node allocation request uploaded by a user terminal, obtaining the gateway node corresponding to the service node allocation request, and searching the candidate service node corresponding to the gateway node; obtaining the network address of the found candidate service node and the corresponding node quality reference value, and returning the data to the user terminal.

As shown in FIG. 2, the user terminal 50 is connected to the WAN by using the gateway node 20 and sends a service node allocation request to the login node 10. The service node allocation request is then forwarded by the gateway node 20b. Upon receiving the service node allocation request, the login node 10 searches the network address and the corresponding node quality reference value of the candidate service node corresponding to the gateway node 20b. As shown in Table 1, the network addresses of the service node 30a, service node 30b, and service node 30c, and the node quality reference values $V_{ba}$, $V_{bb}$, and $V_{bc}$ of the service node 30a, service node 30b, and service node 30c are searched and returned to the user terminal 50. The user terminal 50 may display the values (Node quality reference values are processed for display. For example, the darkness and hues of colors reflect the levels of node quality reference values, with green indicating "excellent", yellow "medium", and red "poor") to the user. The user may select a service node for connection based on the displayed node quality reference values.

For example, in an application scenario of an online chess and cards game, a user in Guangdong province, China, accesses the Internet with a smartphone by using a 2G network and plays the game. The operator of the online chess and cards game deploys five service nodes in Guangdong, namely, Guangdong region 1, Guangdong region 2, Guangdong region 3, Guangdong region 4, and Guangdong region 5. In addition, Guangdong region 1, Guangdong region 2, Guangdong region 3, and Guangdong region 4 are the candidate service nodes of the GGSN that functions as the gateway node in the region where the user resides. After the user inputs his or her account and password for identity verification on the login node (equivalent to sending a service node allocation request), the login node obtains the network addresses of Guangdong region 1, Guangdong region 2, Guangdong region 3, and Guangdong region 4 respectively and the corresponding node quality reference values and returns the obtained data to the smartphone used by the user. The smartphone displays the five service nodes in a list. Guangdong region 1 and Guangdong region 2, with relatively small node quality reference values, are displayed in green; Guangdong region 3, with a medium node quality reference value, is displayed in yellow; Guangdong region 4, with a relatively large node quality reference value, is displayed in red; Guangdong region 5 is displayed as not an option. Thus, the user may select service nodes in Guangdong region 1 and Guangdong region 2 for connection to ensure good gaming experience.

The step of selecting a service node from candidate service nodes based on network quality sampling data and candidate node network quality parameters, and allocating the selected service node to the gateway node may further comprise: receiving a service node allocation request uploaded by a user terminal, and obtaining the gateway node corresponding to the service node allocation request; obtaining the network addresses allocated to the service nodes corresponding to the gateway node, and returning the network addresses to the user terminal.

As shown in Table 1, the network address of the service node displayed as the optimal corresponding to related gateway node may be returned to the user terminal.

For example, in an application scenario of a data download application, the service node is a CDN node; the user accesses the Internet with a smartphone by using a 3G network and downloads data by using the data download application. The data download request (equivalent to a service node allocation request) that the user sends to the login node is forwarded by the GGSN to which the user is connected and that functions as the gateway node. The login node searches for the CDN node allocated to the GGSN and redirects the data download request to the allocated CDN node. Thus, the user's smartphone may obtain the downloaded data by using the CDN node.

Further, the smartphone may obtain updated candidate node network quality parameters corresponding to the gateway node uploaded by candidate service nodes to update the candidate node network quality parameters.

A service node is selected from the candidate service nodes based on the network quality sampling data and the candidate node network quality parameters and allocated to the gateway node.

That is, a service node may obtain in real time the second network delays and packet loss rates between itself and multiple service nodes by sending Ping messages to the respective multiple service nodes and send the obtained data to the login node in real time. Based on the received the data, the login node may update in real time the node quality reference values of the candidate service nodes corresponding to each gateway node. For example, Table 1 may be updated on the basis of the second network delays and packet loss rates uploaded in real time by service nodes. The second network delays and packet loss rates obtained in real time are used to update the node quality reference values. Thus, the service nodes with the optimal network quality are always allocated.

A sampling terminal may send test messages to service nodes and calculate available bandwidths periodically, such as every day, every 12 hours, and every hour (For calculation of available bandwidths, test data needs to be downloaded. Therefore, a long sampling interval may be set to avoid causing a high load on service nodes). This prevents significant load pressure on service nodes.

Figure 3:
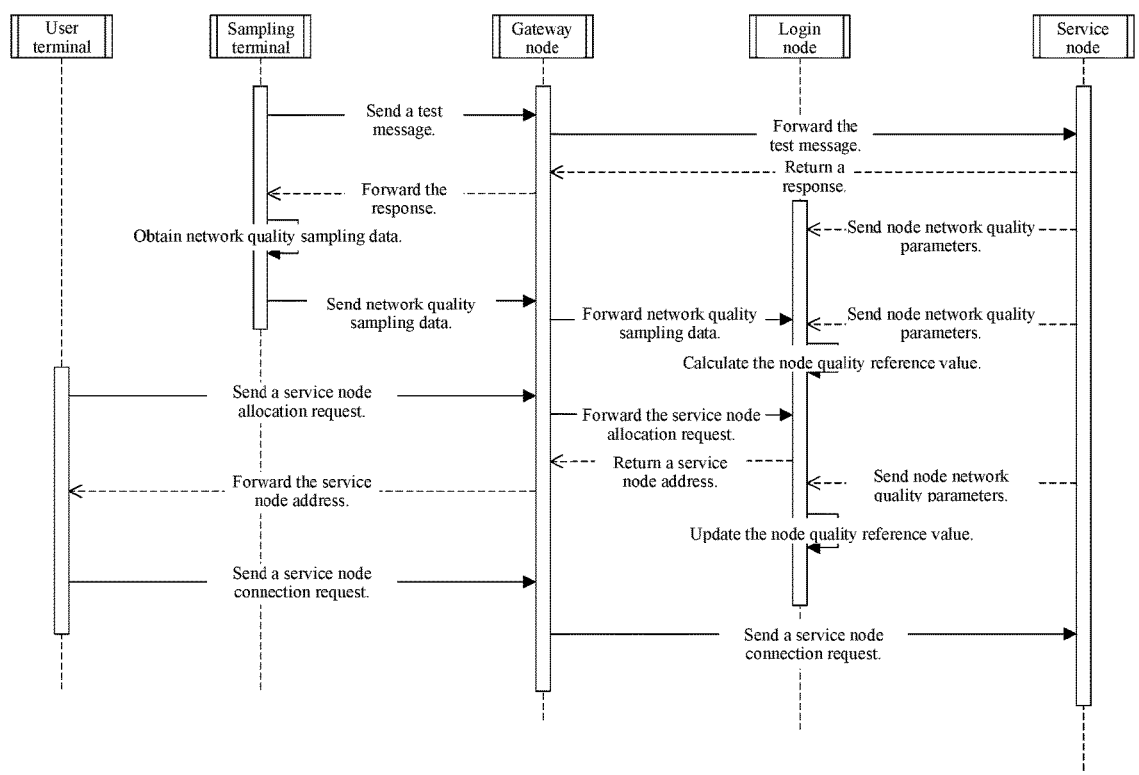
FIG. 3 illustrates a time sequence diagram for an interaction between nodes in a service node allocation system according to the service node allocating methods.

FIG. 3 illustrates a time sequence diagram for an interaction between a sampling terminal, a gateway node, a service node, and a user terminal during service node allocation.

Figure 4:
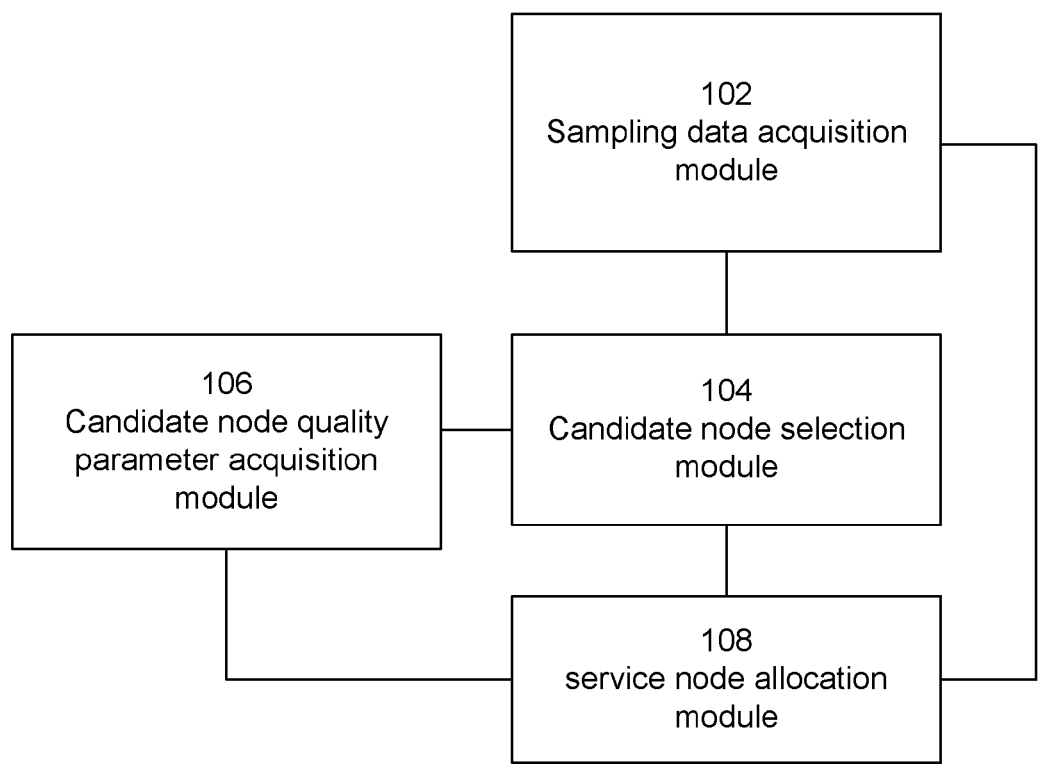
FIG. 4 is a structural diagram of a service node allocating device according to example embodiments of the present disclosure.
Figure 7:
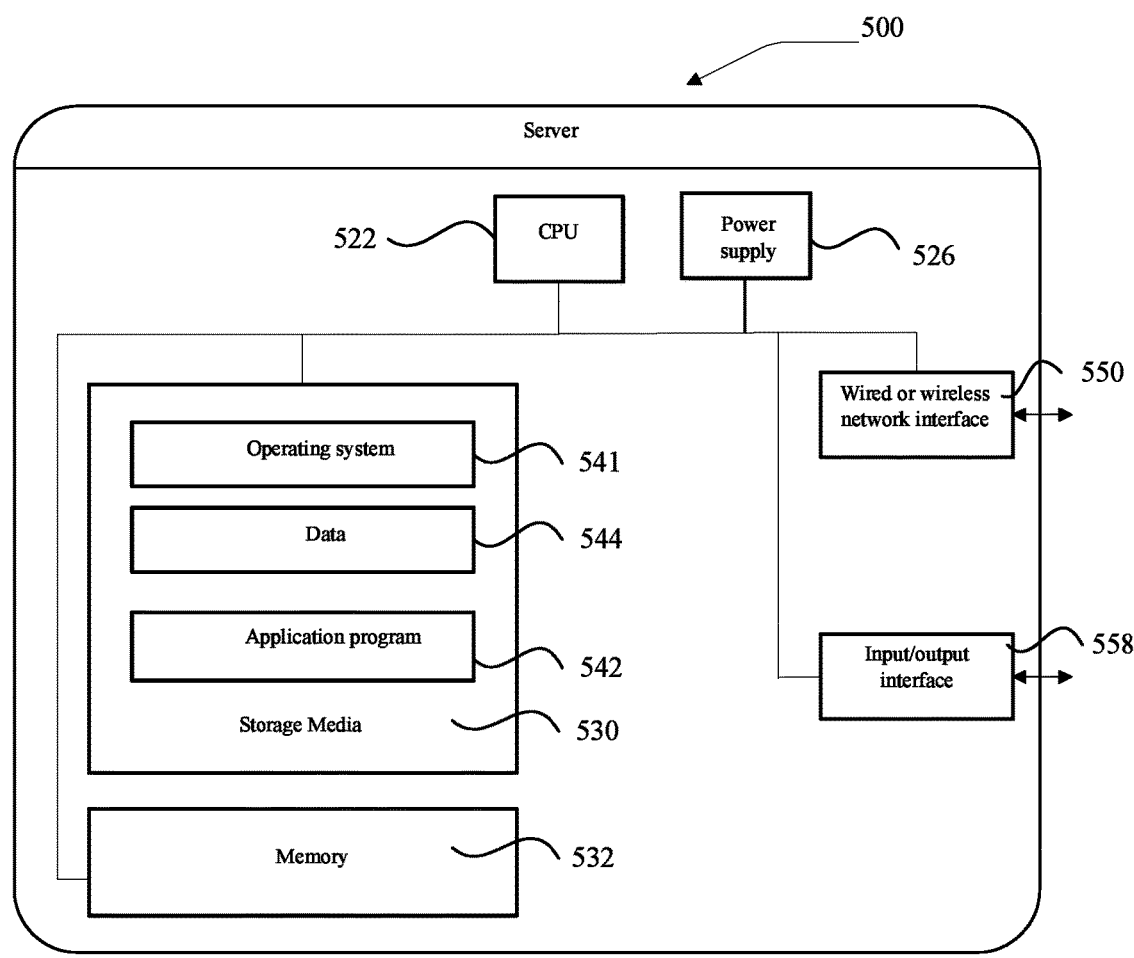
FIG. 7 illustrates an example schematic diagram for a server that implements the service node allocating methods according to example embodiments of the present disclosure.

FIG. 4 is a structural diagram of a service node allocating device according to example embodiments of the present disclosure. The device may be a server as shown in FIG. 7. Further, the device may comprise a sampling data acquisition module 102, a candidate node selection module 104, a candidate node quality parameter acquisition module 106, and a service node allocation module 108.

The sampling data acquisition module 102 is configured to obtain the network quality sampling data corresponding to the service nodes uploaded by a sampling terminal and obtain the gateway node corresponding to the sampling terminal.

The candidate node selection module 104 is configured to select the candidate service nodes corresponding to a gateway node from service nodes based on network quality sampling data.

The candidate node quality parameter acquisition module 106 is configured to obtain the candidate node network quality parameters corresponding to the gateway nodes uploaded by candidate service nodes.

The service node allocation module 108 is configured to select a service node from candidate service nodes based on network quality sampling data and candidate node network quality parameters, and allocate the selected service node to the gateway node.

The network quality sampling data includes the first network delay from the sampling terminal to a service node.

The candidate node selection module 104 is further configured to select the preset number of service nodes with shortest first network delay as the candidate service nodes corresponding to the gateway node.

The network quality sampling data may further include the available bandwidth between a sampling terminal and a service node.

The service node allocation module 108 is further configured to generate the node weight coefficients of candidate service nodes based on available bandwidths, select a service node from candidate service nodes based on the node weight coefficients corresponding to the candidate service nodes and the candidate node network quality parameters, and allocate the selected service node to the gateway node.

The candidate node network quality parameters may further include the second network delays and packet loss rates from service nodes to the gateway node.

The service node allocation module 108 is further configured to generate the node quality reference values corresponding to the candidate service nodes based on the node weight coefficients, the second network delay, and packet loss rates corresponding to candidate service nodes, and select the service nodes corresponding to the gateway node based on the node quality reference values of candidate service nodes.

The service node allocation module 108 is further configured to, based on the following formula:

$$V_i = \text{delay}_i \times (a + plp_i) \times Q_i,$$

obtain the node quality reference value, wherein $V_i$ indicates the node quality reference value of the ith candidate serviced node; $\text{delay}_i$ indicates the second network delay of the ith candidate serviced node; $plp_i$ indicates the packet loss rate of the ith candidate serviced node; $Q_i$ indicates the node weight coefficient of the ith candidate serviced node; and a is a preset parameter.

Figure 5:
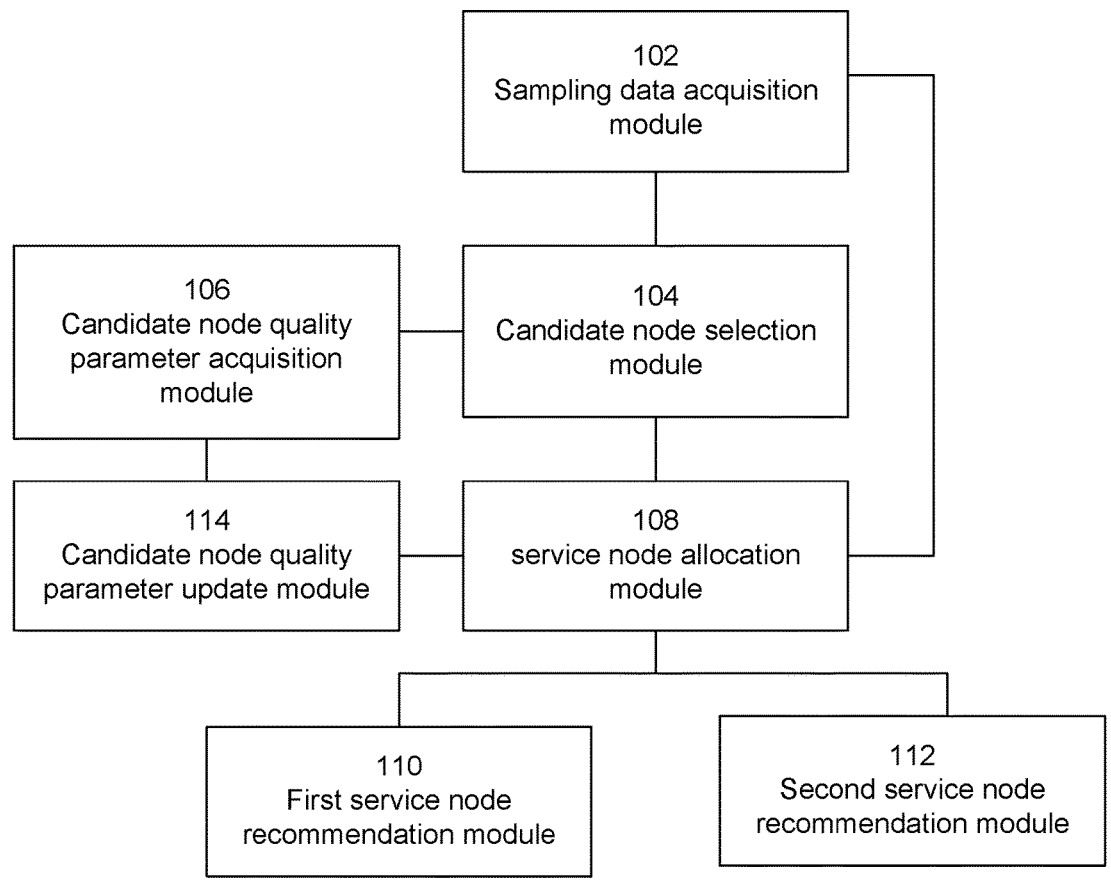
FIG. 5 is a structural diagram of another service node allocating system according to example embodiments of the present disclosure.

FIG. 5 is a structural diagram of another service node allocating system according to example embodiments of the present disclosure. In addition to the modules in FIG. 4, the device for allocating service nodes in FIG. 5 may further comprise a first service node recommendation module 110, which is configured to receive a service node allocation request uploaded by a user terminal, obtain the gateway node corresponding to the service node allocation request and search the candidate service node corresponding to the gateway node; obtain the network address of the found candidate service node and the corresponding node quality reference value and return the data to the user terminal.

In addition, the device for allocating service nodes in FIG. 5 may further comprise a second service node recommendation module 112, which is configured to receive a service node allocation request uploaded by the user terminal and obtain the gateway node corresponding to the service node allocation request; obtain the network addresses allocated to the service nodes corresponding to the gateway node, and return the network addresses to the user terminal.

The device for allocating service nodes in FIG. 5 may further comprise a candidate node quality parameter update module 114, which obtains updated candidate node network quality parameters corresponding to the gateway node uploaded by candidate service nodes to update the candidate node network quality parameters.

Figure 6:
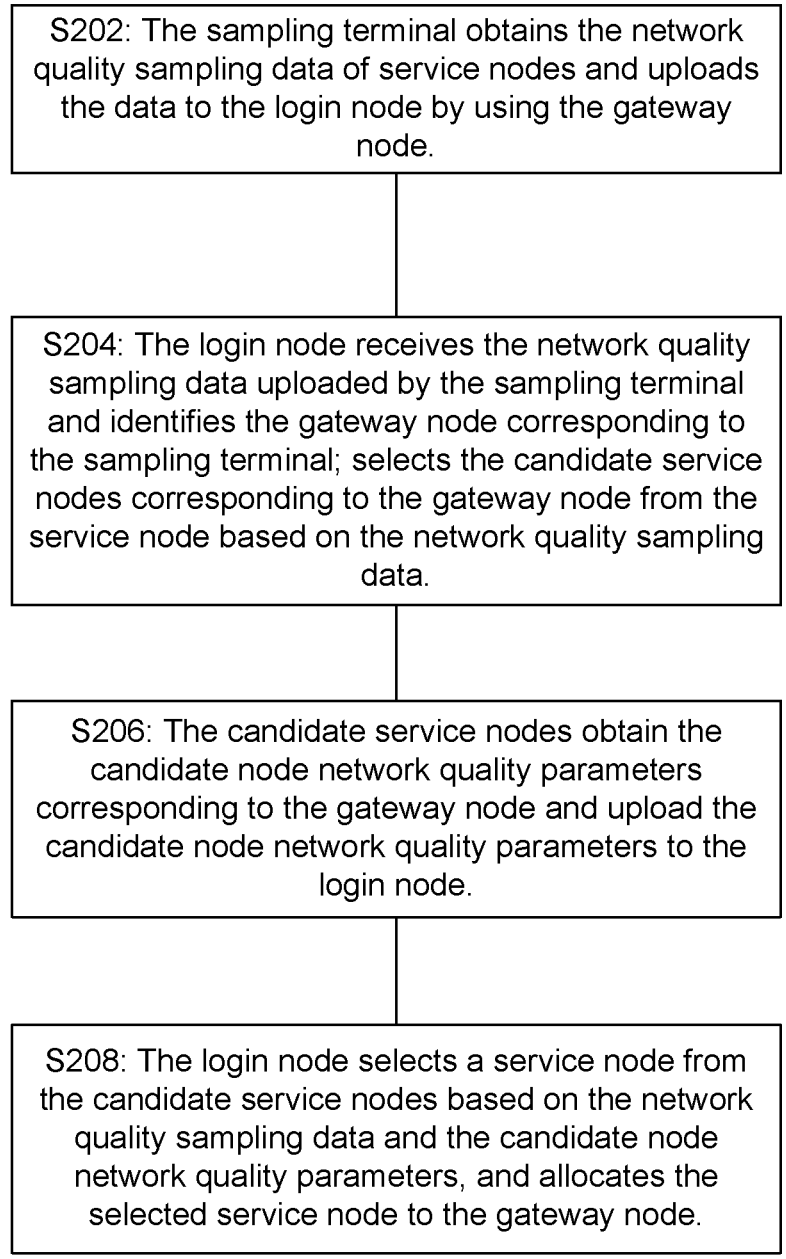
FIG. 6 is a flowchart illustrating a service node allocating method according to example embodiments of the present disclosure.

FIG. 6 is a flowchart illustrating a service node allocating method according to example embodiments of the present disclosure. The method may be implemented by computers and/or computer systems, such as the servers in FIG. 2. For example, the method may be embedded in specific computer programs (i.e., sets of computer instructions). The computer programs may be stored in a storage medium of the service node allocating system and may be executed by the system as a function of the system. The method may include the following steps:

Step S202: The sampling terminal obtains the network quality sampling data of service nodes and uploads the data to the login node by using the gateway node.

Step S204: The login node receives the network quality sampling data uploaded by the sampling terminal and identifies the gateway node corresponding to the sampling terminal; selects the candidate service nodes corresponding to the gateway node from the service node based on the network quality sampling data.

The S206: The candidate service nodes obtain the candidate node network quality parameters corresponding to the gateway node and upload the candidate node network quality parameters to the login node.

Step S208: The login node selects a service node from the candidate service nodes based on the network quality sampling data and the candidate node network quality parameters, and allocates the selected service node to the gateway node.

The network quality sampling data includes the first network delay from the sampling terminal to a service node.

The step of the login step selecting the candidate service nodes corresponding to the gateway node based on network quality sampling data comprises: selecting, by the login node, the preset number of service nodes with shortest first network delays as the candidate service nodes corresponding to the gateway node.

The network quality sampling data may further include the available bandwidth between a sampling terminal and a service node.

The step of the login node selecting a service node from candidate service nodes based on network quality sampling data and candidate node network quality parameters, and allocating the selected service node to the gateway node may further comprise the following operations: generating, by the login node, the node weight coefficients of candidate service nodes based on the available bandwidth, selecting, by the login node, a service node from the candidate service nodes based on the node weight coefficients corresponding to the candidate service nodes and the candidate node network quality parameters, and allocating, by the login node, the selected service node to the gateway node.

The candidate node network quality parameters may further include the second network delays and packet loss rates from service nodes to the gateway node.

The step of the login node selecting a service node from candidate service nodes based on the node weight coefficients corresponding to the candidate service nodes and the candidate node network quality parameters, and allocating the selected service node to the gateway node may further comprise the following operations: generating, by the login node, the node quality reference values corresponding to the candidate service nodes based on the node weight coefficients, the second network delay, and the packet loss rates corresponding to the candidate service nodes, and selecting, by the login node, the service nodes corresponding to the gateway node based on the node quality reference values of the candidate service nodes.

The step of the login node generating the node quality reference values corresponding to the candidate service nodes based on the node weight coefficients, the second network delay, and packet loss rates corresponding to the candidate service nodes is as follows: obtaining the node quality reference value based on the following formula:

$$V_i = \text{delay}_i \times (a + plp_i) \times Q_i$$

wherein $V_i$ indicates the node quality reference value of the ith candidate serviced node; $\text{delay}_i$ indicates the second network delay of the ith candidate serviced node; $plp_i$ indicates the packet loss rate of the ith candidate serviced node; $Q_i$ indicates the node weight coefficient of the ith candidate serviced node; and a is the preset parameter.

The step of the login node selecting a service node from candidate service nodes based on network quality sampling data and candidate node network quality parameters, and allocating the selected service node to the gateway node may further comprise the following operations: sending, by the user terminal, a service node allocation request to the login node by using the gateway node; identifying, by the login node, the gateway node that forwards the service node allocation request, searching, by the login node, the candidate service nodes corresponding to the gateway node, obtaining, by the login node, the network addresses of the found candidate service nodes and the corresponding node quality reference values, and returning, by the login node, the data to the user terminal.

The step of the login node selecting a service node from candidate service nodes based on network quality sampling data and candidate node network quality parameters, and allocating the selected service node to the gateway node may further comprise the following operations: the user terminal sending a service node allocation request to the login node by using the gateway node; the login node obtaining the gateway node that forwards the service node allocation request, obtaining the network addresses allocated to the service nodes corresponding to the gateway node, and returning the obtained network address to the user terminal.

In an embodiment, as shown in FIG. 2, the system for allocating service nodes comprises the login node 10, the gateway node 20, the service node 30, and the sampling terminal 40.

The sampling terminal 40 is configured to obtain the network quality sampling data of service nodes and upload the data to the login node 10 by using the gateway node;

The login node 10 is configured to obtain the network quality sampling data uploaded by the sampling terminal and obtain the gateway node corresponding to the sampling terminal; select the candidate service nodes corresponding to the gateway node from the service nodes 30 based on the network quality sampling data.

The candidate service nodes 30 are configured to obtain the candidate node network quality parameters corresponding to the gateway node and upload the parameters to the login node 10.

The login node 10 selects a service node from candidate service nodes based on network quality sampling data and candidate node network quality parameters, and allocates the selected service node to the gateway node 20.

The network quality sampling data includes the first network delay from the sampling terminal to a service node.

The login node is further configured to select the preset number of service nodes with shortest first network delay as the candidate service nodes corresponding to the gateway node.

The network quality sampling data may further include the available bandwidth between a sampling terminal and a service node.

The login node is further configured to generate the node weight coefficients of candidate service nodes based on available bandwidths, select a service node from the candidate service nodes based on the node weight coefficients corresponding to the candidate service nodes and the candidate node network quality parameters, and allocate the selected service node to the gateway node.

The candidate node network quality parameters may further include the second network delays and packet loss rates from service nodes to the gateway node.

The login node is further configured to generate the node quality reference values corresponding to the candidate service nodes based on the node weight coefficients, the second network delay, and packet loss rates corresponding to candidate service nodes, and select the service nodes corresponding to the gateway node based on the node quality reference values of the candidate service nodes.

The login node is further configured to, based on the following formula:

$$V_i = \text{delay}_i \times (a + plp_i) \times Q_i$$

obtain the node quality reference value, wherein $V_i$ indicates the node quality reference value of the ith candidate serviced node; $\text{delay}_i$ indicates the second network delay; $plp_i$ indicates the packet loss rate; $Q_i$ indicates the node weight coefficient; and $a$ is the preset parameter.

The login node is further configured to receive a service node allocation request uploaded by a user terminal, obtain the gateway node corresponding to the service node allocation request, and search the candidate service node corresponding to the gateway node; obtain the network address of the found candidate service node and the corresponding node quality reference value, and return the data to the user terminal.

The login node is further configured to obtain the service node allocation request uploaded by a user terminal, obtain the gateway node corresponding to the request, obtain the network addresses allocated to the service nodes corresponding to the gateway node, and return the obtained network addresses to the user terminal.

With the above-mentioned method, device, and system for allocating service nodes, service nodes are allocated to user terminals based on the gateway node to which the user terminals are connected, instead of on simple geographical locations. In addition, when service nodes are allocated on the basis of gateway node, not only the data that reflects the network quality of service nodes collected by the sampling terminal connected to the gateway node but also the data that reflects the network quality from service nodes to the gateway node uploaded by the service nodes are referenced, and service nodes are allocated are by combining these two pieces of data and on the basis of gateway node. Thus, when the user terminals managed by a gateway node access service nodes to implement service needs by using the gateway node, the terminals may always get connected to the service nodes with the optimal network quality. Compared with the existing art, wherein service nodes are allocated on the basis of geographical factors, the method, device, and system provided by the present disclosure ensure that service nodes with the optimal network quality are allocated to users.

FIG. 7 illustrates an example schematic diagram for a server that implements the service node allocating methods disclosed in below example embodiments. The server structure can be used on the login node 10 as shown in FIG. 2. The server 500 may vary significantly depending on configurations and performance. The server 500 may comprise one or more central processing units (CPUs) 522 (for example, one or more processors), the memory 532, and one or more storage media 530 (for example, one or more mass storage devices) configured to store the application program 542 or the data 544. The memory 532 and the storage medium 530 may be non-transitory or transitory storage medium and provide non-transitory or transitory storage accordingly. The programs stored in the storage medium 530 may include one or more modules, such as the above-mentioned sampling data acquisition module 102, candidate node selection module 104, candidate node quality parameter acquisition module 106, and service node allocation module 108. Each module may contain a series of instruction operations to be performed on the server. Further, the CPU 522 may be configured to communicate with the storage medium 530 and perform on the server 500 a series of instruction operations stored in the storage medium 530. The server 500 may further comprise one or more power modules 526, one or more wired or wireless network interfaces 550, one or more input/output interfaces 558, and/or one or more operating systems 541, such as Windows SERVER™, Mac OS X™, UNIX™, LINUX™, and FREEBSD™. The steps performed by the server provided in the example embodiments as shown in FIG. 1 can be based on the server structure as shown in FIG. 7. Those of ordinary skill in the art would understand, at the time of filing of this disclosure, that all or part of the flows of the methods described in the above-mentioned embodiments may be implemented by related hardware as instructed by a computer program; the program may be stored on a computer-readable storage medium and, when executed, may comprise the flows of the embodiments of the above-mentioned methods. The storage medium may be a magnetic disk, optical disk, Read-Only Memory (ROM), or Random-Access Memory (RAM).

Further, merely for illustration, only one processor is be described in the server that execute operations and/or method steps in the above example embodiments. However, it should be note that the server in the present disclosure may also include multiple processors, thus operations and/or method steps that are performed by one processor as described in the present disclosure may also be jointly or separately performed by the multiple processors. For example, if in the present disclosure a processor of a server executes both step A and step B, it should be understood that step A and step B may also be performed by two different processors jointly or separately in the server (e.g., the first processor executes step A and the second processor executes step B, or the first and second processors jointly execute steps A and B).

While the present disclosure has been particularly disclosed and described above with reference to the preferred embodiments, it should be understood that the description is not intended to limit the present disclosure. Various modifications and alterations may be made by those of ordinary skill in the art without departing from the spirit and scope of the present disclosure as defined by the Claims attached herein.

The invention claimed is:

1. A computer device, comprising:
a processor-readable storage medium storing a set of instructions configured to allocate a plurality of service nodes in a network to mobile user terminal, the plurality of service nodes configured to communicate with a gateway node; and
a processor in communication with the storage medium, wherein when executing the set of instructions, the processor is programmed to receive a login request from a mobile user terminal to the network and in response to the login request from the mobile user terminal to the network to:
obtain from a sampling terminal, network quality sampling data associating with each of the plurality of service nodes;
identify the gateway node corresponding to the sampling terminal;
select a plurality of candidate service nodes from the plurality of service nodes based on the network quality sampling data;
obtain network quality parameters between each of the plurality of candidate service node and the gateway node;
select a target service node from the plurality of candidate service nodes to provide service to the mobile terminal user based on the network quality sampling data and the network quality parameters; and
allocate the target service node to the gateway node.

2. The computer device according to claim 1, wherein the network quality sampling data of a service node comprises a first network delay between the sampling terminal and the service node; and
to select the plurality of candidate service nodes the processor is further programed to perform functions to:
rank the plurality of service node according to their respective first network delay; and
select from the plurality of service node a preset number of service nodes with the shortest first network delay as the plurality of candidate service nodes.

3. The computer device according to claim 1, wherein the network quality sampling data of a service node comprises an available bandwidth between the sampling terminal and the service node; and
to select the target service node from the plurality of candidate service nodes the processor is further programed to perform functions to:
generate a node weight coefficient for each of the plurality of candidate service nodes based on the corresponding available bandwidth; and
select the target service node from the plurality of candidate service nodes based on the corresponding node weight coefficients and the corresponding candidate node network quality parameters.

4. The computer device according to claim 3, wherein the candidate node network quality parameter of a candidate service node comprises a network delay and a packet loss rate for a communication between the candidate service node and the gateway node; and
to select the target service node from the plurality of candidate service nodes based on the corresponding node weight coefficients and the corresponding candidate node network quality parameters the processor is further programed to perform functions to:
generate a node quality reference value for each of the plurality of candidate service nodes based on the corresponding node weight coefficient, the second network delay, and the packet loss rate corresponding to the candidate service node;
select the target service node based on the node quality reference values of the plurality of candidate service nodes.

5. The computer device according to claim 4, wherein the node quality reference value of an ith candidate service node in the plurality of candidate nodes is generated under a formula of
wherein is the node quality reference value, is the second network delay of the ith candidate service node; is the packet loss rate; is the node weight coefficient; and is a preset parameter.

6. The computer device according to claim 4, wherein the processor is further programed to perform functions to:
receive a service node allocation request from a user terminal,
identify the gateway node corresponding to the service node allocation request,
search the plurality of candidate service nodes corresponding to the gateway node; and
obtain network addresses of the plurality of candidate service nodes and their corresponding node quality reference values; and
send the network addresses of the plurality of candidate service nodes and their corresponding node quality reference values to the user terminal.

7. The computer device according to claim 1, wherein the processor is further programed to perform functions to:
receive a service node allocation request from a user terminal
identify the gateway node corresponding to the service node allocation request;
obtain the network addresses of the plurality of service nodes in communication with the gateway node, and
return the network addresses to the user terminal.

8. A network system for allocating service nodes to a mobile user terminal to login a network, comprising:
a plurality of service nodes;
a gateway node in communication with the plurality of service nodes;
a sampling terminal in communication with the gateway node; and
a login node in communication with the sampling terminal, the gateway node, and the plurality of service node, wherein when the network system receives a login request from a mobile user terminal:
the sampling terminal is configured to
obtain the network quality sampling data of service nodes, and
send the data to the login node by using the gateway node;

the login node is configured to
obtain the network quality sampling data,
identify the gateway node corresponding to the sampling terminal, and
select a plurality of candidate service nodes corresponding to the gateway node from the plurality of service nodes based on the network quality sampling data;
the candidate service node is configured to
obtain the candidate node network quality parameters corresponding to the gateway node, and
send the parameters to the login node;
the login node is configured to
select a target service node from the plurality of candidate service nodes to provide service to the mobile user terminal based on the network quality sampling data and the candidate node network quality parameters, and
allocate the target service node to the gateway node.

9. The system according to claim 8, wherein the network quality sampling data of a service node comprises a first network delay between the sampling terminal and the service node; and
the login node is further configured to
rank the plurality of service node according to their respective first network delay; and
select from the plurality of service node a preset number of service nodes with the shortest first network delay as the plurality of candidate service nodes.

10. The system according to claim 8, wherein the network quality sampling data of a service node comprises an available bandwidth between the sampling terminal and the service node; and
the login node module is further configured to
generate a node weight coefficient for each of the plurality of candidate service nodes based on the corresponding available bandwidth; and
select the target service node from the plurality of candidate service nodes based on the corresponding node weight coefficients and the corresponding candidate node network quality parameters.

11. The system according to claim 10, wherein the candidate node network quality parameter of a candidate service node comprises a network delay and a packet loss rate for a communication between the candidate service node and the gateway node; and
the login node is further configured to
generate a node quality reference value for each of the plurality of candidate service nodes based on the corresponding node weight coefficient, the second network delay, and the packet loss rate corresponding to the candidate service node;
select the target service node based on the node quality reference values of the plurality of candidate service nodes.

12. The system according to claim 11, wherein the login node being further configured to obtain the node quality reference value of an ith candidate service node in the plurality of candidate nodes under a formula of
wherein is the node quality reference value, is the second network delay of the ith candidate service node; is the packet loss rate; is the node weight coefficient; and is a preset parameter.

13. The system according to claim 11, wherein
the login node is further configured to receive a service node allocation request from a user terminal,
identify the gateway node corresponding to the service node allocation request,
search the plurality of candidate service nodes corresponding to the gateway node; and
obtain network addresses of the plurality of candidate service nodes and their corresponding node quality reference values; and
send the network addresses of the plurality of candidate service nodes and their corresponding node quality reference values to the user terminal.

14. The system according to claim 8, wherein the login node is further configured to
receive a service node allocation request from a user terminal
identify the gateway node corresponding to the service node allocation request;
obtain the network addresses of the plurality of service nodes in communication with the gateway node, and
return the network addresses to the user terminal.

15. A method for allocating a service node to a mobile user terminal to login a network, comprising:
providing a network system programed to allocate a plurality of service nodes in a network, wherein the network comprises a gateway node in communication with the plurality of service nodes, a sampling terminal in communication with the gateway node, and a login node in communication with the sampling terminal, the gateway node, and the plurality of service node;
receiving a login request from a mobile user terminal and in response to the login request from the mobile user terminal:
obtaining, by the network system from the sampling terminal, network quality sampling data associating with each of the plurality of service nodes;
identifying, by the network system, the gateway node corresponding to the sampling terminal;
selecting, by the network system, a plurality of candidate service nodes from the plurality of service nodes based on the network quality sampling data;
obtaining, by the network system, network quality parameters between each of the plurality of candidate service node and the gateway node;
selecting, by the network system, a target service node from the plurality of candidate service nodes to provide service to the mobile user terminal based on the network quality sampling data and the candidate node network quality parameters; and
allocating, by the network system, the target service node to the gateway node.

16. The method according to claim 15, wherein the network quality sampling data of a service node comprises a first network delay between the sampling terminal and the service node; and
the selecting of the plurality of candidate service nodes comprises:
ranking the plurality of service node according to their respective first network delay; and
selecting from the plurality of service node a preset number of service nodes with the shortest first network delay as the plurality of candidate service nodes.

17. The method according to claim 15, wherein the network quality sampling data of a service node comprises an available bandwidth between the sampling terminal and the service node; and
the selecting of the target service node from the plurality of candidate service nodes further comprise:
generating a node weight coefficient for each of the plurality of candidate service nodes based on the corresponding available bandwidth; and selecting the target service node from the plurality of candidate service nodes based on the corresponding node weight coefficients and the corresponding candidate node network quality parameters.

18. The method according to claim 17, wherein the candidate node network quality parameter of a candidate service node comprises a network delay and a packet loss rate for a communication between the candidate service node and the gateway node;
the selecting of the target service node from the plurality of candidate service nodes based on the corresponding node weight coefficients and the corresponding candidate node network quality parameters further comprises:
generating a node quality reference value for each of the plurality of candidate service nodes based on the corresponding node weight coefficient, the second network delay, and the packet loss rate corresponding to the candidate service node;
selecting the target service node based on the node quality reference values of the plurality of candidate service nodes.

19. The method according to claim 18, further comprising:
receiving, by the network system, a service node allocation request from a user terminal,
identifying, by the network system, the gateway node corresponding to the service node allocation request,
searching, by the network system, the plurality of candidate service nodes corresponding to the gateway node; and
obtaining, by the network system, network addresses of the plurality of candidate service nodes and their corresponding node quality reference values; and
sending, by the network system, the network addresses of the plurality of candidate service nodes and their corresponding node quality reference values to the user terminal.

20. The method according to claim 15, further comprising:
receiving, by the network system, a service node allocation request from a user terminal
identifying, by the network system, the gateway node corresponding to the service node allocation request;
obtaining, by the network system, the network addresses of the plurality of service nodes in communication with the gateway node, and
returning, by the network system, the network addresses to the user terminal.

* * * * *